United States Patent
Ruijters et al.

(10) Patent No.: US 8,730,237 B2
(45) Date of Patent: May 20, 2014

(54) COUPLING THE VIEWING DIRECTION OF A BLOOD VESSEL'S CPR VIEW WITH THE VIEWING ANGLE ON THE 3D TUBULAR STRUCTURE'S RENDERED VOXEL VOLUME AND/OR WITH THE C-ARM GEOMETRY OF A 3D ROTATIONAL ANGIOGRAPHY DEVICE'S C-ARM SYSTEM

(75) Inventors: Daniel Simon Anna Ruijters, Eindhoven (NL); Nicolaas Hylke Bakker, Eindhoven (NL); Robert Johannes Frederik Homan, Batenburg (NL)

(73) Assignee: Koninklijke Philips N.V., Eindhoven (NL)

( * ) Notice: Subject to any disclaimer, the term of this patent is extended or adjusted under 35 U.S.C. 154(b) by 617 days.

(21) Appl. No.: 12/670,866

(22) PCT Filed: Jul. 31, 2008

(86) PCT No.: PCT/IB2008/053081
§ 371 (c)(1),
(2), (4) Date: Jan. 27, 2010

(87) PCT Pub. No.: WO2009/019640
PCT Pub. Date: Feb. 12, 2009

(65) Prior Publication Data
US 2010/0239140 A1   Sep. 23, 2010

(30) Foreign Application Priority Data

Aug. 3, 2007   (EP) .................................... 07113770

(51) Int. Cl.
*G06T 15/08*   (2011.01)
*G06T 19/00*   (2011.01)

(52) U.S. Cl.
USPC ............ 345/424; 345/419; 382/128; 382/130

(58) Field of Classification Search
None
See application file for complete search history.

(56) References Cited

U.S. PATENT DOCUMENTS 5,734,384 A * 3/1998 Yanof et al. .................. 345/424
6,195,450 B1   2/2001 Qian et al.
(Continued)

FOREIGN PATENT DOCUMENTS

WO   2005048198 A1   5/2005

OTHER PUBLICATIONS

Soderman et al: "3D Roadmap in Neuroangiography: Technique and Clinical Interest"; Neuroradiology (2005), vol. 47, pp. 735-740.
(Continued)

*Primary Examiner* — Kee M Tung
*Assistant Examiner* — Sing-Wai Wu

(57) ABSTRACT

The present invention describes a method for rendering and displaying a curved planar reformat (CPR) view (7') of a blood vessel's 3D tubular structure (1), wherein the viewing direction of the curved planar reformat view (7') is coupled to the viewing angle on a segmented or raw representation of the 3D tubular structure's rendered voxel volume to be visualized or, alternatively, to the C-arm geometry of a 3D rotational angiography device's C-arm system (6). The proposed method thus enables measurements on the X-ray image which do not suffer from spatial foreshortening and do not need to be calibrated. Thereby, said coupling can be performed bidirectional. According to a first aspect of the proposed method, this means that the viewing direction of the aforementioned curved planar reformat view (7') follows the viewing angle on a segmented or raw representation of the 3D tubular structure's rendered voxel volume to be visualized, or vice versa. According to another aspect of the proposed method, this means that the viewing direction of the curved planar reformat view (7') is set depending on the C-arm geometry given by the roll ($\theta_x$), pitch ($\theta_y$) and yaw angle ($\theta_z$) of a 3D rotational angiography device's C-arm system (6), or vice versa.

16 Claims, 6 Drawing Sheets

(56) References Cited

U.S. PATENT DOCUMENTS

| | | | |
|---|---|---|---|
| 6,505,065 B1* | 1/2003 | Yanof et al. | 600/427 |
| 7,010,080 B2 | 3/2006 | Mitschke et al. | |
| 7,133,492 B2 | 11/2006 | Kramp et al. | |
| 2005/0110791 A1 | 5/2005 | Krishnamoorthy et al. | |
| 2006/0247520 A1* | 11/2006 | McGee | 600/434 |

OTHER PUBLICATIONS

Ruijters et al: "3D Multimodality Roadmapping in Neuroangiography";, Proceedings of the SPIE, vol. 6509, 2007, pp. 65091F-1-65091F-8.

Kanitsar et al: "CPR-Curved Planar Reformation"; IEEE Visualization 2002, pp. 37-44.

Yanof et al: "Image-Guided Therapy (IGT): New CT and Hybrid Imaging Technologies"; Advances in Healthcare Technology, 2006, pp. 147-166.

Avants et al: "An Adaptive Minimal Path Generation Technique for Vessel Tracking in CTA/CE-MRA Volume Images"; MICCAI 2000, LNCS 1935, pp. 707-716.

He et al: "Medial Axis Reformation: A New Visualization Method for CT Angiography"; Academic Radiology 2001, vol. 8, pp. 726-733.

Felkel et al: "Surface Reconstruction of the Branching Vessels for Augmented Reality Aided Surgery"; Biosignal 2002, pp. 252-254.

\* cited by examiner

COUPLING THE VIEWING DIRECTION OF A BLOOD VESSEL'S CPR VIEW WITH THE VIEWING ANGLE ON THE 3D TUBULAR STRUCTURE'S RENDERED VOXEL VOLUME AND/OR WITH THE C-ARM GEOMETRY OF A 3D ROTATIONAL ANGIOGRAPHY DEVICE'S C-ARM SYSTEM

FIELD OF THE INVENTION

The present invention describes a method for rendering and displaying a curved planar reformat (CPR) view of a blood vessel's 3D tubular structure, wherein the viewing direction of the curved planar reformat view is coupled to the viewing angle on a segmented or raw representation of the 3D tubular structure's rendered voxel volume to be visualized and/or to the C-arm geometry of a 3D rotational angiography device's C-arm system. The proposed method enables measurements on the X-ray image which do not suffer from spatial foreshortening and do not need to be calibrated.

BACKGROUND OF THE INVENTION

Non-invasive imaging of the vascular system with the aid of computed tomography (CT) and magnetic resonance imaging (MRI) has become a well-established alternative to invasive intra-arterial angiography. Both CT and MRI provide high-resolution volumetric data sets that can be used for visualizing anatomical objects (internal organs, bones and joints, blood vessels, etc.) and pathological structures in the interior of a patient's body to be examined. These data, however, may contain many objects of less or even no diagnostic interest. This makes clinically relevant volume rendering—i.e., Maximum Intensity Projection (MIP), ray casting, Shaded Surface Display (SSD)—without preprocessing often difficult or even impossible.

Visualization of 3D tubular structures, such as e.g. blood vessels, is an important topic in CT- and MRI-based medical imaging. One way to display such 3D tubular structures for diagnostic purposes is to generate longitudinal cross-sections so as to show their lumen, wall, and surrounding tissue in a curved visualization plane. This process is called Curved Planar Reformation (CPR). A curved planar reformat—also known as a "curved planar reconstruction"—is a graphical visualization of a 3D tubular structure's longitudinal cross-section on such a curved visualization plane. The goal of curved reformatting is to make the tubular structure to be graphically displayed and examined visible in its entire length within a single image and without spatial foreshortening. To accomplish this requirement, a-priori information about the tubular structure, notably the 3D object's centerline, is required.

In particular, Curved Planar Reformation (CPR) is a way to visualize vascular structures with small diameter. Thereby, high-level information, such as e.g. a blood vessel's centerline (in the following also referred to as "central axis"), is used to resample and visualize image data which have previously been acquired by CT or MR angiography. Without loss of generality, the vessel's centerline is assumed to be a sequence of points at sub-voxel resolution. In general, the spatial position and shape of the centerline determines which parts of the 3D space are visualized. Using this technique, the whole length of the blood vessel is displayed within a single image. Vascular abnormalities (i.e., ulcerated stenoses, occlusions, aneurysms and vessel wall calcifications) can then be investigated by a physician. Current CPR techniques allow an investigation of a vessel lumen in a longitudinal section through the central axis of the vessel. In case vascular abnormalities are not touched by this plane and therefore do not appear in the generated image, the resampled plane is rotated around the central axis. This results in a set of images to be interpreted by the radiologist. Alternatively, a thick curved multiplanar reformat (CMPR) can be used.

Another aspect in today's computed tomography angiography is efficient visualization of treelike vascular structures using CPR display techniques. Multipath CPR techniques based on a projective combination of vessel segments provide a spatially coherent display of a patient's vascular anatomy. Thereby, however, parts of the arteries might be superimposed by other arteries depending on the respectively selected intersecting plane. For a detailed inspection of the entire vascular tree, different sections through the vessel's central axis have to be resampled.

TECHNOLOGICAL BACKGROUND

A prerequisite for CPR visualization is an appropriate estimation of the vessel centerline. Latest CT technology, such as multiple detector array CT, provide high resolution volumetric data sets. Due to the large size of these data sets (which typically comprise up to 1,900 transverse cross-sectional images of e.g. the abdomen and entire legs), manual definition of the vessel centerline is no longer an option. In this context, several algorithms have been developed with different properties concerning reliability, execution speed and accuracy. In the article "An Adaptive Minimal Path Generation Technique for Vessel Tracking in CTA/CE-MRA Volume Images" (in: MICCAI 2001, pp. 707-716, 2000) by B. Avants and J. Williams, a vessel tracking method consisting of two parts is presented. Thereby, a surface expansion is computed based on user-defined seed points by applying the eikonal partial differential equation. A minimal cost path is calculated for these regions. Then, a cross-sectional area/radius profile is generated from this path. A path extraction method based on a two-dimensional region-growing algorithm with a subsequent shortest-path algorithm is proposed by S. He et al. in their article "Medial Axis Reformation: A New Visualization Method for CT Angiography" (in: Academic Radiology 8, pp. 726-733, 2001). Therein, it is described that the resulting path is refined by using a multi-scale medial response. Vascular trees are flattened in a semiautomatic method called "Medial Axis Reformation". As disclosed in "Surface Reconstruction Of The Branching Vessels For Augmented Reality Aided Surgery" (in: BIOSIGNAL 2002, pp. 252-254, June 2002) by P. Felkel et al., abstract vessel models using polygonal meshes of low complexity are generated, which allows fast rendering of the image data to be visualized. In the article "CPR—Curved Planar Reformation" (in: IEEE Visualization 2002, pp. 37-44, ACM, October 2002) by A. Kanitsar et al., three methods for CPR generation are described: projected CPR, stretched CPR and straightened CPR. In addition, three extensions of CPR, developed to overcome the most relevant clinical limitations of CPR visualization, are proposed: thick CPR, rotating CPR and multi-path CPR. The latter provides a display of a whole vascular tree within one image. While superimposition of bones and arteries is prevented, intersection of arteries itself, on the other hand, is not avoided.

For integrating 2D fluoroscopy and 3D vessel reconstruction display, 3D Roadmapping, a recently introduced imaging method which has been patented by Philips, can be applied. This technology ensures that the 3D image is registered with the system and overlaid with live 2D fluoroscopy, thus providing a sustainable roadmap. The clinical potential for this technology is particularly significant for applications such as real-time catheter navigation and monitoring coil delivery. The 3D roadmap is durable, improves workflow and further reduces contrast media and X-ray doses. Thereby, a variety of problems, mostly related to user inability to make an interactive link between the 2D information coming from the X-ray fluoroscopy image and its corresponding position within the 3D data set, can be solved. The major difference from standard 2D digital roadmap technique is that newly developed 3D roadmap is based on a rotational angiography acquisition technique with a two-dimensional fluoroscopic image as an overlay. Data required for an accurate superimposition of a previously acquired 3D reconstructed image on an interactively made 2D fluoroscopy image are stored in the 3D workstation and constitute the calibration dataset. These two datasets are spatially aligned in real time. Thus, the 3D image and the 2D fluoroscopic image can be accurately superimposed, regardless of any change in C-arm position or magnification. The principal advantage of the described roadmap method is that one contrast injection allows the C-arm to be positioned anywhere in the space and allows alterations in the distance between the X-ray tube and the image intensifier as well as changes in image magnification. In a clinical setting, the 3D roadmap facilitates intravascular neuronavigation with concurrent reduction of procedure time and use of contrast medium. For further information on this topic, the interested reader is referred to the article "3D Roadmap in Neuroangiography: Technique and Clinical Interest" (in: Neuroradiology, Vol. 47, No. 10, pp. 735-740, October 2005) by M. Söderman, D. Babic, R. Homan and T. Andersson.

In the following, two control modes for controlling the C-arm geometry of a conventional 3D rotational angiography device which are to be known for a better understanding of the present invention—in the prior art referred to as Follow C-arc and 3D Automatic Position Control (3D APC)—shall be described briefly.

When the aforementioned Follow C-arc mode is selected, the orientation of the 3D rotational angiography device's volume data follows the C-arm geometry viewing incidence. Therefore, an X-ray image, created from this incidence, should depict the same scene as displayed on the monitor of a workstation connected to said 3D rotational angiography device for visualizing said volume data. This mode can be used to plan a view without actually radiating or injecting a contrast medium and to evaluate the 3D morphology of a tissue region to be visualized for a given viewing incidence.

3D Automatic Position Control (3D APC) can be regarded as the opposite of the Follow C-arc mode. After a user presses a 3D APC button, the 3D APC functionality steers the C-arm geometry to match the viewing direction of the 3D rotational angiography volume data. In contrast to the Follow C-arc mode, the up-vector of the 2D projection image and the 3D rotational angiography volume do not necessarily correspond. Only their viewing directions correspond to each other.

WO 2005/048,198 A1 refers to a method as well as to a corresponding apparatus for visualizing a tubular structure of an object by use of a 3D image data set of said object. In order to provide a more efficient and illustrative visualization, a method is proposed which comprises the steps of generating and visualising a curved planar reformat image from a symbolic pathway view of said tubular structure, said symbolic pathway view representing said tubular structure and the pathway points of said symbolic pathway being assigned with their 3D spatial position data and, finally, generating and visualising at least one planar view of said object through a viewing point of said tubular structure selected in said curved planar reformat image or said symbolic pathway view.

SUMMARY OF THE INVENTION

Curved planar reformat images are commonly used when reviewing arteries in CT reconstructions, e.g. in the diagnosis of coronary artery disease. One advantage consists in the fact that a curved planar reformat image is able to display blood vessels without any spatial foreshortening and to display the surrounding tissue regions in the interior of a patient's body to be examined. The absence of spatial foreshortening facilitates accurate measurements on the vessels. If a narrowing of the vessel (e.g. a lesion or a stenosis, etc.) is found on the CT, an intervention is performed in a cardiovascular X-ray cathlab. Lesions are often eccentric, which means that the minimum cross-section of a lesion is only visible in a specific orientation of a curved reformatted view. At the start of cardiovascular interventions, X-ray angiographic images were acquired in several views so as to confirm the diagnosis made on a computed tomogram. Depending on the respective patient's anatomy, a substantial number of angiographies are needed to find a view on the anatomy that shows the minimum cross-sectional area of the lesion. This means patient exposure to potentially harmful contrast agent and both patient and staff exposure to X-ray radiation dose.

It may thus be an object of the present invention to integrate pre-procedural diagnostic curved reformat views in the minimally invasive treatment of ulcerated stenoses, aneurysms, lesions or other vascular pathologies so as to reduce the number of unnecessary angiographies which are needed to find a specific viewing direction on pathological objects to be visualized, said view direction being given by the viewing angle on a segmented or raw representation of the 3D tubular structure's rendered voxel volume to be visualized or by the C-arm roll, pitch and yaw angle of a 3D rotational angiography device's C-arm system, respectively, and hence to reduce the patient and clinical staff exposure to X-ray radiation dose and provide for an improved diagnostic workflow.

The present invention therefore describes a method for rendering and displaying a curved planar reformat view of a blood vessel's 3D tubular structure, wherein the viewing direction of the curved planar reformat view is coupled to the viewing angle on a segmented or raw representation of the 3D tubular structure's rendered voxel volume to be visualized or, alternatively, to the orientation of the C-arm of a 3D rotational angiography device's C-arm system (in the following also referred to as "C-arm geometry").

The proposed method may e.g. be realized in form of six different modes that will be described in the following sections of this application.

According to a first mode of the aforementioned method, the viewing direction of the curved planar reformat view follows the viewing angle on a segmented or raw representation of the 3D tubular structure's voxel volume to be visualized as closely as possible. This is especially useful when manipulating the 3D view.

According to a second mode of this method, the curved planar reformat view follows the C-arm geometry of a 3D rotational angiography device's C-arm system, which means that the viewing direction of the curved planar reformat view is set depending on the roll, pitch and yaw angle of said C-arm. This results in a curved planar reformat view which corresponds best to the (live) X-ray image. This mode is particularly useful for guidance during the intervention. It allows a comparison of acquired angiographic X-ray data with pre-procedural CT or MR data in the same orientation.

According to a third mode of the aforementioned method, the viewing angle on a segmented or raw representation of the 3D tubular structure's voxel volume follows the viewing direction of the curved planar reformat view. In this mode, the up-vector of the acquired 3D voxel data is always set to correspond to the X-ray image that would be taken from the same viewing direction. This mode is particularly useful when planning angiographic views prior to the procedure.

According to a fourth mode of said method, the C-arm geometry of a 3D rotational angiography device's C-arm system given by the roll, pitch and yaw angle of the C-arm is set depending on the viewing direction of the curved planar reformat view. This enables a clinician to let the X-ray image correspond as closely as possible to a view that has been planned by using said curved planar reformat view. It allows a comparison of the acquired angiographic X-ray data with the pre-procedural CT/MR data in the same orientation.

According to a fifth mode of the aforementioned method, in the following sections referred to as "Locked Interaction", the viewing angle on the 3D tubular structure's voxel volume is only allowed to be manipulated in such a way that the corresponding curved planar reformat view does not change. After selecting a curved planar reformat view that shows an eccentric lesion, the view on the acquired 3D voxel data is manipulated to find an optimal angle without changing the selected curved planar reformat view. This mode is particularly useful when a minimum cross-section of a lesion is found on the curved planar reformat view and an angiographic view is planned that also shows this minimum cross-section where the remaining rotation of the 3D view allows the selection of a view in which no overlap between different vessel segments occurs.

A sixth mode of said method is directed to a variant whereupon a fused visualization of the 3D tubular structure's curved planar reformat view and a 2D projection image (such as e.g. an X-ray image or a rendered 2D view) showing a two-dimensional projection of this structure may be rendered and displayed. This is different from conventional image fusing techniques as known from the prior art, whereupon a blood vessel's 3D tubular structure is projected into the coordinate space of the 2D projection image. According to said sixth mode, the 2D projection image is re-projected into the coordinate space of the curved planar reformat view by being submitted to a spatial deformation algorithm that yields transformed image data matching with the spatial course of the 3D tubular structure in the curved planar reformat view's coordinate space. This leads to a fused image representation that is essentially free of spatial foreshortening and enables direct measurements which do not need to be calibrated.

Furthermore, contextual information (e.g. concerning the surrounding soft-tissue of said blood vessel in the interior of a patient's body to be examined) to the position of specific interventional medical devices, such as e.g. guidewires, balloon catheters, cardiovascular stents, etc., may be provided.

According to said sixth mode, said method may be performed by the sequence of the following steps: determining the central axis of the 3D tubular structure to be visualized, determining all the parameters of a 2D-3D registration mapping for registering the 3D tubular structure's voxel volume with the 2D projection image, determining the parameters of a curved reformat mapping for transforming the coordinates of the 3D tubular structure's central axis in a curved plane following the spatial course of said central axis in its longitudinal direction as well as in a latitudinal direction parallel to the projection plane of the 2D projection image into the curved planar reformat view's coordinate space, compositing the curved planar reformat view and the 2D projection image of said 3D tubular structure's voxel volume by performing said 2D-3D registration mapping, curved reformat mapping and/or a mapping rule inverse to said curved reformat mapping, and visualizing a fused image of the curved planar reformat view and the 2D projection image of the 3D tubular structure's voxel volume after being submitted to said 2D-3D registration mapping, curved reformat mapping and/or inverse curved reformat mapping.

For generating a fused visualization of the curved planar reformat view and the 2D projection image of said 3D tubular structure's voxel volume, an alpha blending technique may be used.

Furthermore, an exemplary embodiment of the present invention does also refer to an image rendering system for rendering and displaying a 3D tubular structure's curved planar reformat view and a 2D image showing a two-dimensional projection of this structure, said image rendering system being specially adapted for performing a method as described above.

Finally, a computer software product programmed for performing said method when running on the aforementioned image rendering system is provided.

BRIEF DESCRIPTION OF THE DRAWINGS

Advantageous features, aspects, and advantages of the invention will become evident from the following description, the appended claims and the accompanying drawings. Thereby.

DETAILED DESCRIPTION OF THE PRESENT INVENTION

Figure 1:
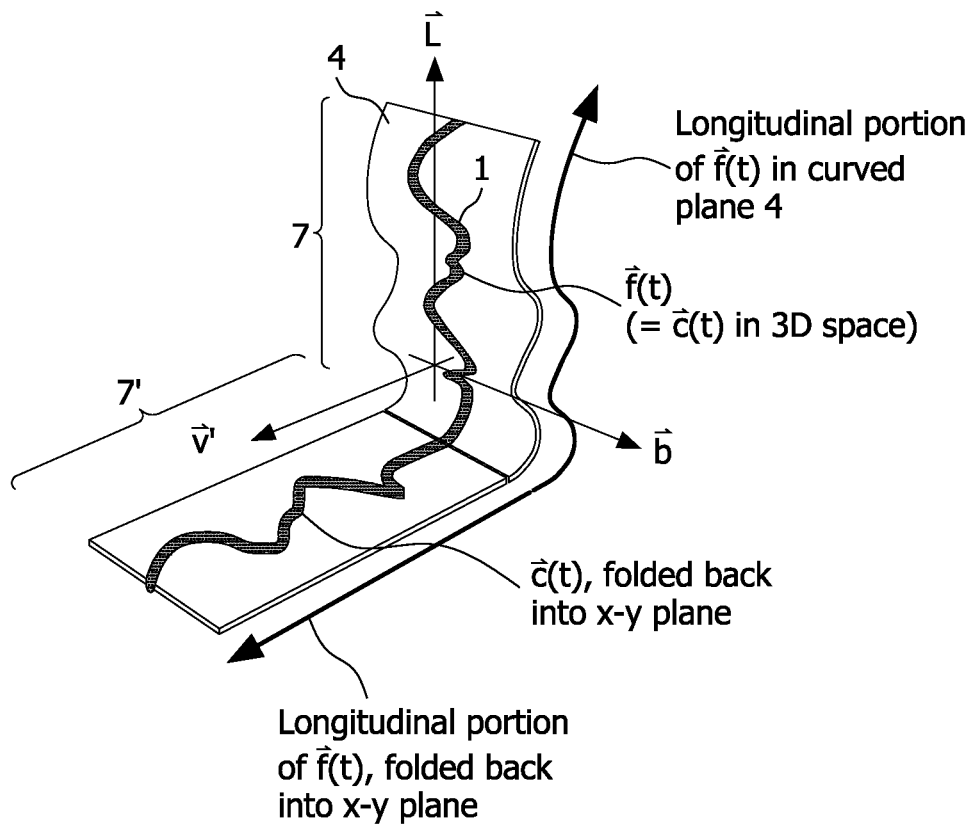
FIG. 1 shows a 3D diagram which exemplarily illustrates the inventive curved reformatting process of a 3D tubular structure, such as e.g. blood vessel segment, which is to be visualized in a curved visualization plane without spatial foreshortening.
Figure 2:
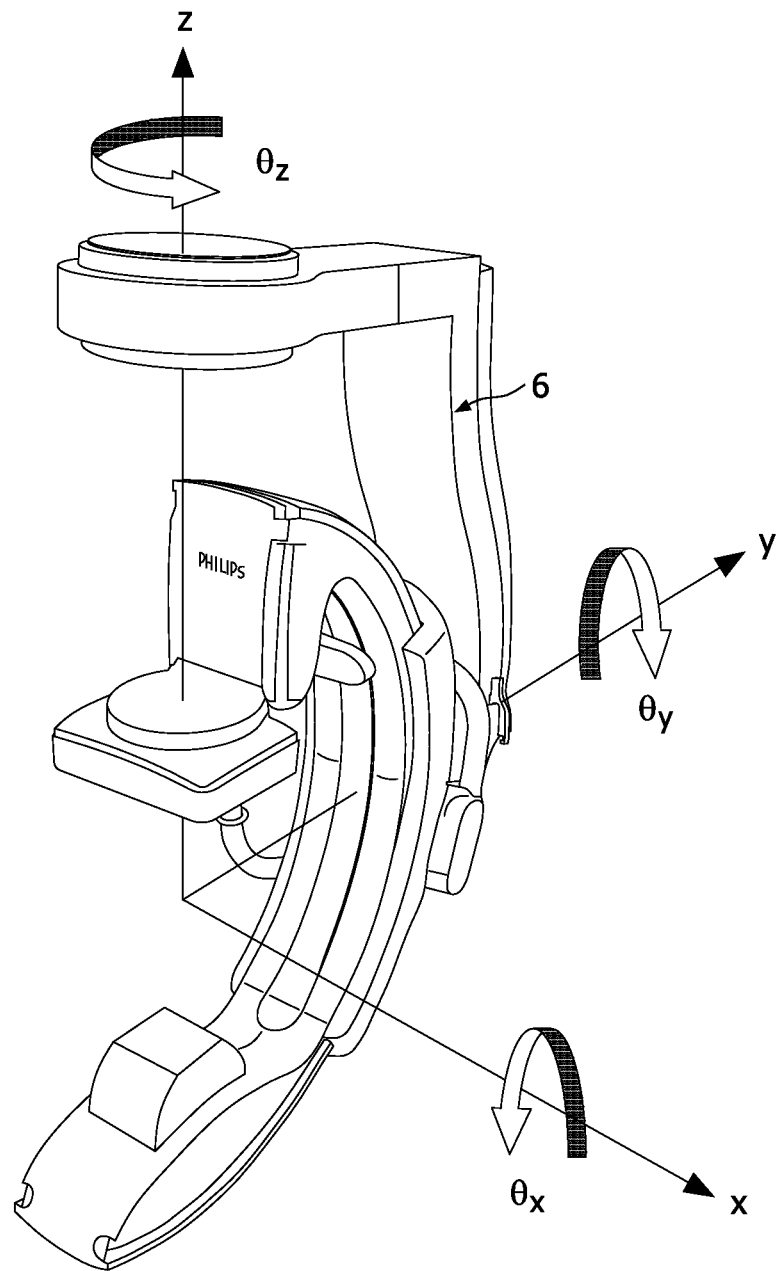
FIG. 2 shows the C-arm geometry of a 3D rotational angiography device's C-arm system in a three-dimensional Cartesian coordinate system referring to said 3D rotational angiography device, said C-arm system being pivotable about the three orthogonal axes x, y and/or z spanning said coordinate system by manipulating the roll, pitch and/or yaw angle of said C-arm.

In the following, the CPR-based visualization method according to an exemplary embodiment of the present invention will be explained in more detail with respect to special refinements and referring to the accompanying drawings. Thereby, a blood vessel's 3D tubular structure 1 that has been segmented from an acquired CT or MR image by means of a segmentation algorithm, said 3D tubular structure being sufficiently described by a curvilinear central axis, shall be assumed as being an anatomical object to be graphically visualized.

When defining the path of said blood vessel's 3D tubular structure's central axis by $\vec{x} = \vec{f}(t)$, whereby $\vec{x}$ denotes the Cartesian position vector of a 3D position P(x, y, z) in a three-dimensional Cartesian coordinate system of an Euclidian vector space $V=^3$ and t is a real-valued scalar parameter ranging from 0 to 1, the normalized longitudinal vector $\vec{l}$ of the central axis can be expressed by the equation $$\vec{l} = \frac{\Delta \vec{x}_{AB}}{\|\Delta \vec{x}_{AB}\|_2^2} \text{ with } \|\vec{l}\|_2 = 1$$

and $\Delta \vec{x}_{AB} := \vec{x}_B - \vec{x}_A = \vec{f}(t=1) - \vec{f}(t=0)$ with (1a-c)
O being the origin of the coordinate system,
$\vec{x}_A \equiv \overrightarrow{OA} = \vec{f}(t=0) = [x_A, y_A, z_A]^T \in V$ being a position vector of a given starting point A with Cartesian coordinates $x_A$, $y_A$ and $z_A$ on said central axis,
$\vec{x}_B \equiv \overrightarrow{OB} = \vec{f}(t=1) = [x_B, y_B, z_B]^T \in V$ being the Cartesian position vector of a given end point B with Cartesian coordinates $x_B$, $y_B$ and $z_B$ on said central axis and $$\|\Delta \vec{x}_{AB}\|_2 := \sqrt{\langle \Delta \vec{x}_{AB}, \Delta \vec{x}_{AB} \rangle} = \sqrt{(x_B - x_A)^2 + (y_B - y_A)^2 + (z_B - z_A)^2}$$ (1d)

being the Euclidian norm of difference vector $\Delta \vec{x}_{AB}$. Let $\vec{v}$ (with $\vec{v} \in V$) be a three-dimensional viewing vector for describing a given perspective of view in Euclidian vector space V. Then, latitudinal vector $\vec{b}$ of said blood vessel's 3D tubular structure's central axis, given in a normalized form, can be defined as follows:

$$\vec{b} = \frac{\vec{v} \times \vec{l}}{\|\vec{v} \times \vec{l}\|_2^2} = \frac{\vec{v}}{\|\vec{v}\|_2^2} \times \frac{\vec{l}}{\|\vec{l}\|_2^2} \text{ with } \|\vec{b}\|_2 = 1,$$ (2a, b)

and a viewing vector $\vec{v}'$ which is perpendicular to the longitudinal vector $\vec{l}$ and the above-defined latitudinal vector $\vec{b}$) is thus given by $$\vec{v}' = \vec{b} \times \vec{l} = -\frac{\vec{w}}{\|\vec{w}\|_2} \text{ with}$$ (3a)

$$\vec{w} := \vec{v} - \underbrace{proj(\vec{v}|\vec{l}) \cdot \vec{e}_l}_{=:\vec{v}_l} = \vec{v} - \|\vec{v}\|_2 \cdot \cos'(\vec{v}, \vec{l}) \cdot \frac{\vec{l}}{\|\vec{l}\|_2} = \vec{v} - \frac{\langle \vec{v}, \vec{l} \rangle}{\|\vec{l}\|_2^2} \cdot \vec{l}$$ (3b)

wherein $\vec{v}_l$ is the orthogonal projection vector of viewing vector $\vec{v}$ as defined above onto the direction of longitudinal vector $\vec{l}$, $$\langle \vec{v}, \vec{l} \rangle = \|\vec{v}\|_2 \cdot \|\vec{l}\|_2 \cdot \cos'(\vec{v}, \vec{l})$$ (3c)

denotes the inner product ("dot product") of viewing vector $\vec{v}$ and longitudinal vector $\vec{l}$, and $\vec{e}_l = (1/\|\vec{l}\|_2) \cdot \vec{l} = \vec{l}$ is the basis vector in the direction of $\vec{l}$. From equation (3b) it can be derived that $$\vec{v}' = \vec{b} \times \vec{l} = -\frac{\vec{v}}{\|\vec{v}\|_2}$$ (3d)

is only valid for the special case of
$$\langle \vec{v}, \vec{l} \rangle = 0 \Leftrightarrow \vec{v} \perp \vec{l}.$$ (3e)

When defining the orientation of the 3D Cartesian coordinate system's orthogonal axes x, y and z in such a way that the x-axis shows in the direction of said latitudinal vector $\vec{b}$ and the y-axis shows in the direction of said longitudinal vector $\vec{l}$, these vectors can be identified as orthonormal basis vectors in x and y direction, respectively, and perpendicular viewing vector $\vec{v}'$ can be identified as a normalized basis vector in z direction, orthogonally arranged with respect to $\vec{b}$ and $\vec{l}$.

With the above-given parameterization of Cartesian position vector $\vec{x}$ the curvature of said 3D tubular structure's central axis which is obtained when straightening curved visualization plane 4 spanned by said blood vessel's central axis and latitudinal vector $\vec{b}$ in the direction of longitudinal vector $\vec{l}$, which means the curvature of $\vec{f}(t)$ when being projected into a two-dimensional plane spanned by the two orthonormal vectors $\vec{v}'$ and $\vec{l}$, can be derived by removing those parts of $\vec{f}(t)$ that protrude in the direction of latitudinal vector $\vec{b}$. The resulting "smoothed" curvature $\vec{c}(t)$ can thus be expressed by the following equation:

$$\vec{c}(t) = \vec{f}(t) - \Delta \vec{f}_b(t)$$ (4a)

with $$\Delta \vec{f}_b(t) := proj(\Delta \vec{f}(t) | \vec{b}) \cdot \vec{e}_b$$ (4b)
$$= \|\Delta \vec{f}(t)\|_2 \cdot \cos'(\vec{b}, \Delta \vec{f}(t)) \cdot \frac{\vec{b}}{\|\vec{b}\|_2}$$
$$= \frac{\langle \vec{b}, \Delta \vec{f}(t) \rangle}{\|\vec{b}\|_2^2} \cdot \vec{b} = \langle \vec{b}, \Delta \vec{f}(t) \rangle \cdot \vec{b},$$

thereby using $$'(\vec{b}, \Delta \vec{f}(t)) = \arccos\left(\frac{\langle \vec{b}, \Delta \vec{f}(t) \rangle}{\|\vec{b}\|_2 \cdot \|\Delta \vec{f}(t)\|_2}\right) [rad]$$

for $'(\vec{b}, \Delta \vec{f}(t)) \in [0, \pi]$, (4c)

$\|\vec{b}\|_2 = 1$ and $\Delta \vec{f}(t) := \vec{f}(t) - \vec{f}(0) = \overrightarrow{OP} - \overrightarrow{OA} = \vec{x} - \vec{x}_A \forall t$. Thereby, $\Delta \vec{f}_b(t)$ is the orthogonal projection vector of difference vector $\Delta f(t)$ as defined above onto the direction of latitudinal vector $\vec{b}$, $$\langle \vec{b}, \Delta \vec{f}(t) \rangle = \underbrace{\|\vec{b}\|_2}_{=1} \cdot \|\Delta \vec{f}(t)\|_2 \cdot \cos'(\vec{b}, \Delta \vec{f}(t))$$ (4d)

denotes the inner product ("dot product") of difference vector $\Delta \vec{f}(t)$ and latitudinal vector $\vec{b}$, and $\vec{e}_b = (1/\|\vec{b}\|_2) \cdot \vec{b} \equiv \vec{b}$ is the basis vector in the direction of $\vec{b}$. Equation (4a) describes a mapping rule $\vec{f}(t) \mapsto C(\vec{f}(t)) = \vec{c}(t)$ which maps curved visualization plane 4 in 3D space to the y-z plane and is expressed by mapping $C: {}^3 \to {}^2$. Given a point $P(x_p, y_p, z_p)$ in 3D Euclidian vector space V spanned by the axes x, y and z of the 3D Cartesian coordinate system, said axes showing in the directions of the orthonormal basis vectors $\vec{b}$, $-\vec{v}'$ and $\vec{l}$ as defined above, respectively, this mapping C can be described by mapping positional vector $\vec{p} = \overrightarrow{OP} = [x_p, y_p, z_p]^T$ of P on 2D projection vector $\vec{p}' = \overrightarrow{OP}' = [x_{p'}, y_{p'}, z_{p'}]^T$ of the positional vector in a plane $x = x_p$ parallel to the y-z plane of the 3D Cartesian coordinate system, thus yielding $$x_{P'} := x_P \equiv \overline{OA_1} = proj(\vec{p} \mid \vec{b}) = \|\vec{p}\|_2 \cdot \cos'(\vec{p}, \vec{b}) \quad (5a)$$
$$= \frac{\langle \vec{p}, \vec{b} \rangle}{\|\vec{b}\|_2} = \langle \vec{p}, \vec{b} \rangle,$$

$$y_{P'} = proj(\vec{p} \mid -\vec{v}') = \|\vec{p}\|_2 \cdot \cos'(\vec{p}, -\vec{v}') \quad (5b)$$
$$= \frac{\langle \vec{p}, -\vec{v}' \rangle}{\|\vec{v}'\|_2} = (-1) \cdot \langle \vec{p}, \vec{v}' \rangle \equiv y_P,$$

and $$z_{P'} = proj(\vec{p} \mid \vec{l}) = \|\vec{p}\|_2 \cdot \cos'(\vec{p}, \vec{l}) \quad (5c)$$
$$= \frac{\langle \vec{p}, \vec{l} \rangle}{\|\vec{l}\|_2} = \langle \vec{p}, \vec{l} \rangle \equiv z_P$$

with $\|b\|_2 = \|\vec{v}'\|_2 = \|\vec{l}\|_2 = 1$. The projected image can then be created by interpolating the voxel intensities in the 3D vector space V on an orthogonal grid, thereby using said mapping rule as given by equation (4a).

Figure 5:
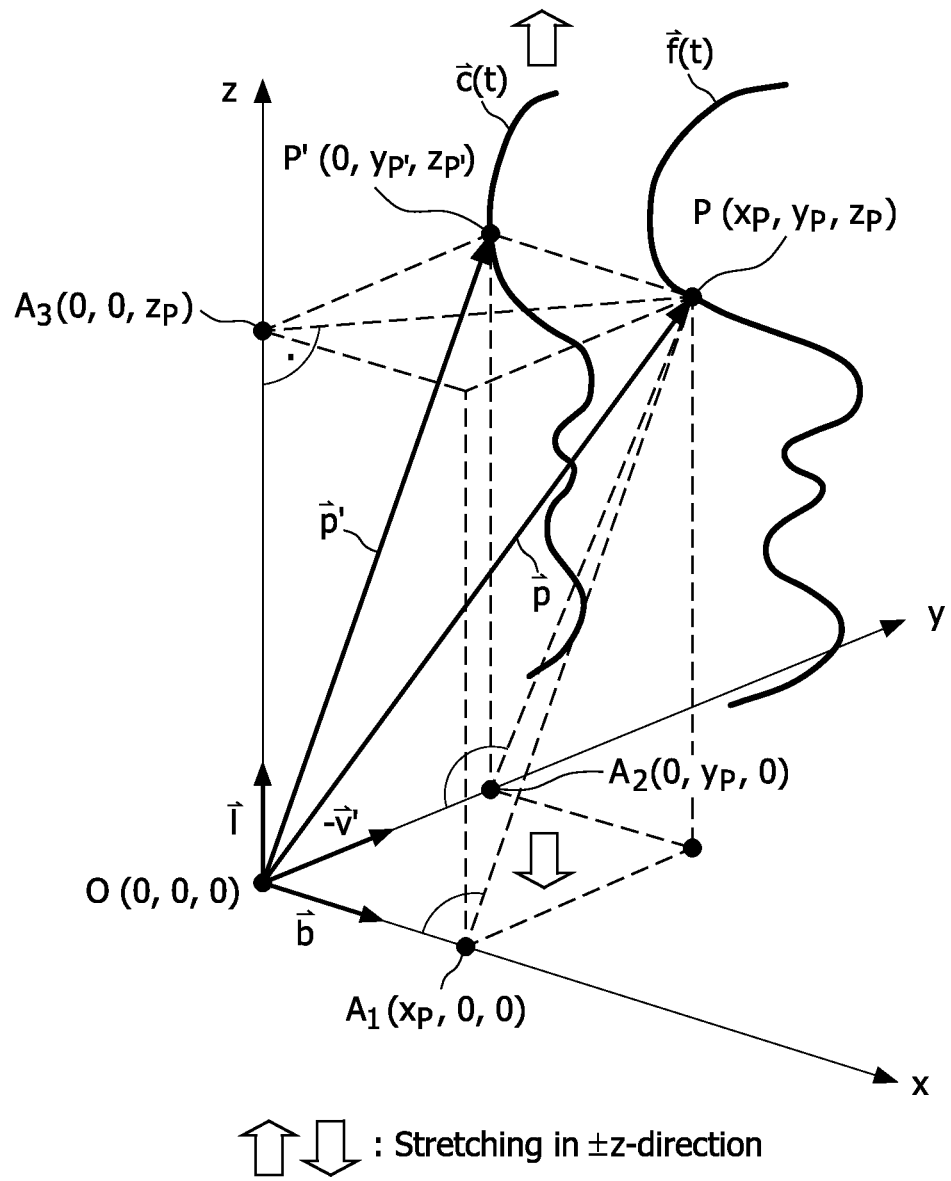
FIG. 5 shows a 3D diagram which illustrates the mapping of said 3D tubular structure's central axis on a 2D projection plane as given by the y-z plane of said 3D Cartesian coordinate system.

FIG. 5 shows a 3D diagram which illustrates a mapping $C_R$ that describes the transition of said 3D tubular structure's central axis to a stretched curved reformat image lying in a 2D projection plane $x = x_p$ parallel to the y-z plane of said 3D Cartesian coordinate system according to said mapping rule. Colloquially spoken, said mapping $C_R$ can be regarded as mapping a 3D point on a sheet of paper, fitted through curve $\vec{c}(t)$, and then stretching the paper by simultaneously pulling at two of its ends. In a more mathematical notation, this means that for a given point $P(x_p, y_p, z_p)$ in 3D space, this mapping $C_R$ can be described by mapping positional vector $\vec{p} = \overrightarrow{OP} = [x_p, y_p, z_p]^T$ of point P on corresponding stretched 2D projection vector $\vec{p}' = \overrightarrow{OP}' = [0, y_{p'}, z_{p'}]^T$ of said positional vector in the y-z plane of the 3D Cartesian coordinate system, said plane being spanned by orthonormal basis vectors $-\vec{v}'$ and $\vec{l}$, wherein said mapping $C_R$ describes a calculation of the two Cartesian coordinates $y_{p'}$ and $z_{p'}$ of 2D vector $\vec{p}'$ which are different from zero. When generating a CPR image in the aforementioned plane $x = x_p$, vector $\vec{p}'$ (which then lies in this plane) has also an x-coordinate that is different from zero. From $\Delta OA_1P$ as sketched in the 3D diagram shown in FIG. 5 it can be taken that said x-coordinate is given by $$x_{P'} := x_P \equiv \overline{OA_1} = proj(\vec{p} \mid \vec{b}) = \|\vec{p}\|_2 \cdot \cos'(\vec{p}, \vec{b}) \quad (6)$$
$$= \frac{\langle \vec{p}, \vec{b} \rangle}{\|\vec{b}\|_2} = \langle \vec{p}, \vec{b} \rangle \text{ with } \|\vec{b}\|_2 = 1.$$

As $\vec{c}(t)$ shall describe the 2D course of a stretched curved planar reformat (CPR) of the curvilinear central axis of said blood vessel's tubular structure as described by parameterized positional vector $\vec{x} = \vec{f}(t)$ (with $t \in [0, 1]$) and not only an orthogonal projection of $\vec{f}(t)$ into the y-z plane, coordinate $y_{p'}$ can not simply be derived by the equation $$y_{P'} \equiv \overline{OA_2} = proj(\vec{p} \mid -\vec{v}') = \|\vec{p}\|_2 \cdot \cos'(\vec{p}, -\vec{v}') \quad (7)$$
$$= \frac{\langle \vec{p}, -\vec{v}' \rangle}{\|\vec{v}'\|_2} = (-1) \cdot \langle \vec{p}, \vec{v}' \rangle = y_P \text{ with } \|\vec{v}'\|_2 = 1,$$

which can be obtained when regarding $\Delta OA_2P$, but by using an approach that starts with regarding $\Delta OA_3P$, from which trigonometric relation $$z_{P'} \equiv \overline{OA_3} = proj(\vec{p} \mid \vec{l}) = \|\vec{p}\|_2 \cdot \cos'(\vec{p}, \vec{l}) \quad (8)$$
$$= \frac{\langle \vec{p}, \vec{l} \rangle}{\|\vec{l}\|_2} = \langle \vec{p}, \vec{l} \rangle \text{ with } \|\vec{l}\|_2 = 1$$

can be obtained, and regarding $\Delta OA_3P$, which yields equation $$z_{P'} \equiv \overline{A_2P'} = proj(\vec{p}' \mid \vec{l}) = \|\vec{p}'\|_2 \cdot \cos'(\vec{p}', \vec{l}) \quad (9)$$
$$= \frac{\langle \vec{p}', \vec{l} \rangle}{\|\vec{l}\|_2} = \langle \vec{p}', \vec{l} \rangle \text{ with } \|\vec{l}\|_2 = 1.$$

Thereby, 2D vector $\vec{p}'$ is assumed to be a function $\vec{c}(t) = [c_x(t), c_y(t), c_z(t)]^T$ of said parameter t (with $t \in [0, 1]$). Equations (7) and (8) can then be used for calculating $y_p$, by setting $$z_P \stackrel{!}{=} z_{P'},$$

ascertaining parameter $t = t_p$ for which condition $$z_P \stackrel{!}{=} z_{P'}$$

is fulfilled, thereby solving equation $c_z(t_p) = z_p$ (with $c_z(t_p) z_{p'}$) for $t_p$, and finding coordinate $z_{p'}$ of point P' in the stretched CPR image by calculating $$z_{P'} = \int_{t=0}^{t_P} \left\| \frac{d\vec{c}(t)}{dt} \right\|_2 dt = \int_{t=0}^{t_P} \sqrt{\dot{c}_y^2(t) + \dot{c}_z^2(t)} \, dt \quad (10\text{a-e})$$

with

-continued $$c_x(t) := x_P, \dot{c}_x(t) \equiv \frac{dc_x(t)}{dt} = 0, \dot{c}_y(t) \equiv \frac{dc_y(t)}{dt} \text{ and } \dot{c}_z(t) \equiv \frac{dc_z(t)}{dt},$$

which corresponds to the length of curve $\vec{c}(t)$ between positions t=0 and t=$t_p$. In this connection, it should be noted that—for simplifying the graphical representation—2D vector $\vec{p}$' sketched in FIG. 5 is given in an unstretched form as obtained by an orthogonal projection of positional vector $\vec{p}$ into the y-z plane and not as obtained when generating a stretched CPR to simplify the graphical representation.

In the following, aspects of the proposed method which are directed to a corresponding one of modes #1 to #5 shall be described.

According to one aspect of the method as proposed by an exemplary embodiment of the present invention, viewing direction $\vec{v}$ is determined by an external entity, such as e.g. by a user controlling an image rendering system needed for displaying a desired 2D view on an acquired set of 3D image data or by the direction of radiated X-rays prescribed by the C-arm geometry, position and orientation of a 3D rotational angiography device's C-arm system controlled by a physician. Using given curved reformat definition above (see equations (1a) to (4d)), a curved reformat is unambiguously defined when said viewing vector $\vec{v}$ is known.

In the first case, a curved reformat image is visualized in a projection plane x=$x_0$ (also referred to as "view port") whose normal vector points in a direction collinear to the x-axis of the 3D Cartesian coordinate system spanning Euclidian vector space V of an acquired set of 3D voxel data. Given a rotational matrix $\ddot{R}$ which describes the relation between the 2D coordinate system of the curved planar reformat view port and the coordinate system of the 3D tubular structure's voxel volume by expressing a rotation of $\phi_x$, $\phi_y$ and $\phi_z$ about the x-, y- or z-axis of the 3D Cartesian coordinate system, viewing vector $\vec{v}$ for visualizing a 3D tubular structure's curved reformat can be written in form of the following matrix-vector product:

$$\vec{v} = \ddot{R}(\varphi_x, \varphi_y, \varphi_z) \cdot \vec{e}_z = \begin{pmatrix} R_{xz}(\varphi_x, \varphi_y, \varphi_z) \\ R_{yz}(\varphi_x, \varphi_y, \varphi_z) \\ R_{zz}(\varphi_x, \varphi_y, \varphi_z) \end{pmatrix}. \quad (11a)$$

Thereby, $\vec{e}_z = [0, 0, 1]^T$ denotes the normalized basis vector in z-direction of the 3D Cartesian coordinate system of vector space V.

In case the curved reformat follows the C-arm geometry, position and orientation of a 3D rotational angiography device, viewing vector $\vec{v}$ for visualizing a 3D tubular structure's curved reformat should correspond to a normal vector $\vec{n}_{DP}$ on the detector plane of the angiography device's X-ray detector. In general, the direction of detector normal $\vec{n}_{DP}$, given as a function of the yaw angle $\theta_z$, pitch angle $\theta_y$ and roll angle $\theta_x$ of said 3D rotational angiography device's C-arm system, can be expressed as follows:

$$\vec{n}_{DP} = \ddot{R}'(\theta_x, \theta_y, \theta_z) \cdot \vec{e}_z = \begin{pmatrix} R'_{xz}(\theta_x, \theta_y, \theta_z) \\ R'_{yz}(\theta_x, \theta_y, \theta_z) \\ R'_{zz}(\theta_x, \theta_y, \theta_z) \end{pmatrix} \text{ using} \quad (11b)$$

$$\ddot{R}'(\theta_x, \theta_y, \theta_z) = \underbrace{\begin{pmatrix} \cos\theta_z & \sin\theta_z & 0 \\ -\sin\theta_z & \cos\theta_z & 0 \\ 0 & 0 & 1 \end{pmatrix}}_{=:\ddot{R}_z(\theta_z)} \cdot \underbrace{\begin{pmatrix} \cos\theta_y & 0 & -\sin\theta_y \\ 0 & 1 & 0 \\ \sin\theta_y & 0 & \cos\theta_y \end{pmatrix}}_{=:\ddot{R}_y(\theta_y)} \cdot \underbrace{\begin{pmatrix} 1 & 0 & 0 \\ 0 & \cos\theta_x & \sin\theta_x \\ 0 & -\sin\theta_x & \cos\theta_x \end{pmatrix}}_{=:\ddot{R}_x(\theta_x)}.$$

Let rotational matrix $\vec{P}(\theta_x', \theta_y', \theta_z')$ express a transformation for transforming the coordinate system of said angiography device's C-arm (coordinate system I) to the coordinate system of the 3D tubular structure's voxel volume (coordinate system II). In case the orientation of the patient with regard to the C-arm geometry of said 3D rotational angiography device's C-arm system is known as well as the orientation of the patient with regard to the acquired 3D data set (e.g. from information stored in the header of a DICOM data packet), no explicit registration is necessary to determine rotational matrix $\vec{P}$. Together with the patient orientation information, rotational matrix $\vec{P}$ is completely determined, even though the orientation of the patient may not contain any information for translating the origin of coordinate system I. The viewing vector $\vec{v}$ of the curved reformat image is then obtained by applying matrix $\vec{P}$ to the detector normal $\vec{n}_{DP}$:

$$\vec{v} = \vec{P}(\theta_x', \theta_y', \theta_z') \cdot \vec{n}_{DP}. \quad (11c)$$

Due to the fact that we are interested only in the direction of detector normal $\vec{n}_{DP}$, the translation with respect to the origin of coordinate system I is not of any importance. In this connection, it should be noted that instead of a real C-arm geometry also a (graphical) model of the C-arm geometry can be used.

According to a further aspect of the method as proposed by an exemplary embodiment of the present invention, a curved reformat image is used for steering an external entity, such as e.g. given by an image rendering system needed for displaying a desired 2D view on an acquired set of 3D image data or by the direction of incident X-rays prescribed by the C-arm geometry, position and orientation of a 3D rotational angiography device. In this mode, external viewing vector $\vec{v}$ is not prescribed which is due to the fact that latitudinal vector $\vec{b}$ can be chosen freely as long as it is perpendicular to longitudinal vector $\vec{l}$, which means that latitudinal vector $\vec{b}$ can be rotated freely around longitudinal vector $\vec{l}$ and set by a user. Then, for a chosen latitudinal vector $\vec{b}$, perpendicular viewing vector $\vec{v}' = \vec{b} \times \vec{l}$ as defined above, which is used for driving the above-described enslaved entity, is calculated.

In the first case, the relation between the 2D coordinate system of the curved planar reformat view port and the 3D Cartesian coordinate system of the acquired 3D voxel data set is described by a rotational matrix $\ddot{R}$ expressing a rotation of $\phi_x$, $\phi_y$ and $\phi_z$ about the x-, y- or z-axis of the 3D Cartesian coordinate system spanning 3D vector space V of the 3D voxel data set, wherein $\ddot{R}$ has to be set accordingly to obey the following condition:

$$\vec{\vec{R}}(\varphi_x, \varphi_y, \varphi_z) \cdot \vec{e}_z = \begin{pmatrix} R_{xz}(\varphi_x, \varphi_y, \varphi_z) \\ R_{yz}(\varphi_x, \varphi_y, \varphi_z) \\ R_{zz}(\varphi_x, \varphi_y, \varphi_z) \end{pmatrix} = \vec{v}'. \quad (12a)$$

However, this condition does not yield a unique rotational matrix. For getting a unique rotational matrix, a second condition has to be fulfilled, whereupon the up-vector of the curved planar reformat view on the acquired 3D voxel data set, given by the y-axis of the reformatted 2D view port, has to correspond to the up-vector of a 3D rotational angiography device's C-arm geometry for a given yaw position.

In case a curved reformat is used for steering the direction of incident X-rays as prescribed by the C-arm geometry, position and orientation of a 3D rotational angiography device's C-arm system 6, the direction of perpendicular viewing vector $\vec{v}$ in the 3D Cartesian coordinate system of said C-arm system can be expressed as follows:

$$\begin{pmatrix} \tilde{x} \\ \tilde{y} \\ \tilde{z} \end{pmatrix} = \vec{\vec{P}}^{-1}(\theta_x, \theta_y, \theta_z) \cdot \vec{v}'. \quad (12b)$$

From vector components $\tilde{x}$, $\tilde{y}$ and $\tilde{z}$ and a given yaw angle $\theta_z$, the corresponding roll ($\theta_x$) and pitch angle ($\theta_y$) determining the angle of incidence of radiated X-rays on the detector plane of said 3D rotational angiography device and can be calculated as follows:

$$\theta_x = \arcsin(\sin\theta_z \cdot \tilde{x} + \cos\theta_z \cdot \tilde{y}), \quad (12c)$$

$$\theta_y = \arctan\left(\frac{\cos\theta_z \cdot \tilde{x} - \sin\theta_z \cdot \tilde{y}}{\tilde{z}}\right). \quad (12d)$$

In another mode, in the following referred to as "Locked Interaction", the curved planar reformat view on the acquired 3D voxel data set of a blood vessel's 3D tubular structure to be visualized can be rotated in such a way that the corresponding curved reformat view does not change. This mode is based on the fact that any viewing vector $\vec{v}$ which is perpendicular to a given latitudinal vector $\vec{b}$ yields the same curved planar reformat view. Thus, said viewing vector $\vec{v}$ can be rotated around latitudinal vector $\vec{b}$ without changing the curved reformat image. The obtained view on the 3D tubular structure's voxel data set can be described by a rotational matrix $\tilde{R}$ expressing the relation between the 2D Cartesian coordinate system of the view port and the 3D Cartesian coordinate system of the voxel data set. Thereby, said rotational matrix $\tilde{R}$ has to obey the following condition:

$$\left\langle \underbrace{\vec{\vec{R}}(\varphi_x, \varphi_y, \varphi_z) \cdot \vec{e}_z}_{=\vec{v}'}, \vec{b} \right\rangle = 0 \Leftrightarrow \vec{v}' \perp \vec{b}. \quad (13)$$

Just as equation (10a), this condition does not lead to a unique rotational matrix. For getting a unique rotational matrix, a second condition has to be fulfilled, whereupon the up-vector of the curved planar reformat view on the aforementioned 3D tubular structure's acquired voxel data set, said up-vector given by the y-axis of the reformatted 2D view port, has to correspond to the up-vector of the 3D rotational angiography device's C-arm system for a given yaw position.

In the following, aspects of the proposed method which are directed to mode #6 shall be described.

Using equations (4a) and (4b), it is possible to take several curved reformat images from a curved multiplanar reformat (CMPR) of 3D tubular structure 1 being projected into parallel visualization planes spanned by two orthonormal basis vectors running parallel to vectors $\vec{b}$ and $\vec{l}$, respectively, said visualization planes being taken at regular intervals in the direction of perpendicular viewing vector $\vec{v}'$, and combine these images by using e.g. an averaging or maximum intensity projection (MIP) algorithm—a computer visualization method for 3D data that projects voxels with maximum intensity that fall in the way of parallel rays traced from the viewpoint to the plane of projection into a visualization plane.

On the assumption that the mapping between 3D vector space V in which said blood vessel's 3D tubular structure 1 is defined and the 2D projection image 8 is known (in other words in case it is known how to project 3D vector space V on the 2D projection image 8), such a mapping can e.g. be obtained by a machine-based 2D-3D registration procedure, by an image-based 2D-3D registration or by more complex multiple registrations which shall not be explained in the scope of this invention for the sake of briefness and simplicity. This mapping can be expressed as P: $^3 \rightarrow ^2$.

Figure 3:
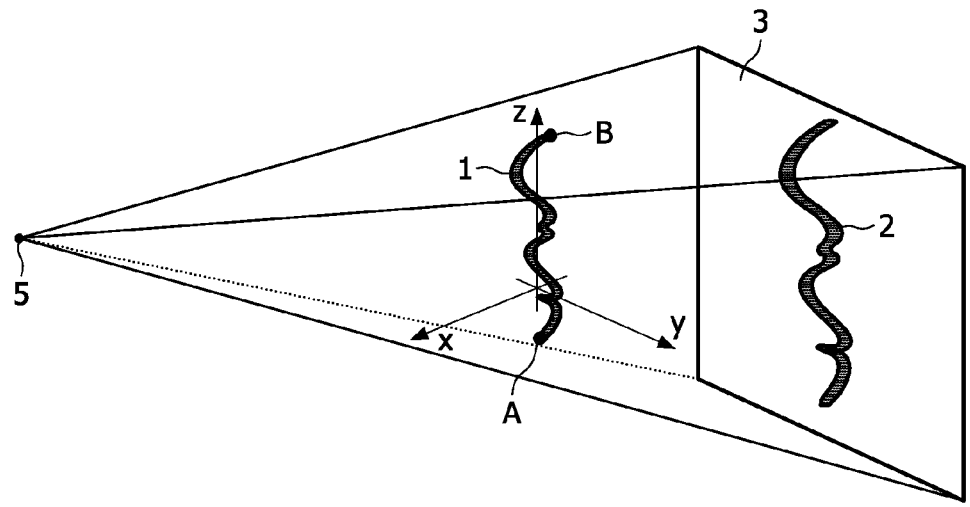
FIG. 3 illustrates a planar projection of said blood vessel's 3D tubular structure, given by a parameterized vector-valued function of its central axis in a 3D Cartesian coordinate system referring to said 3D tubular structure, on a 2D projection plane by performing a mapping for transforming the coordinate system of the 3D tubular structure to the coordinate system of the 2D projection plane.
Figure 4:
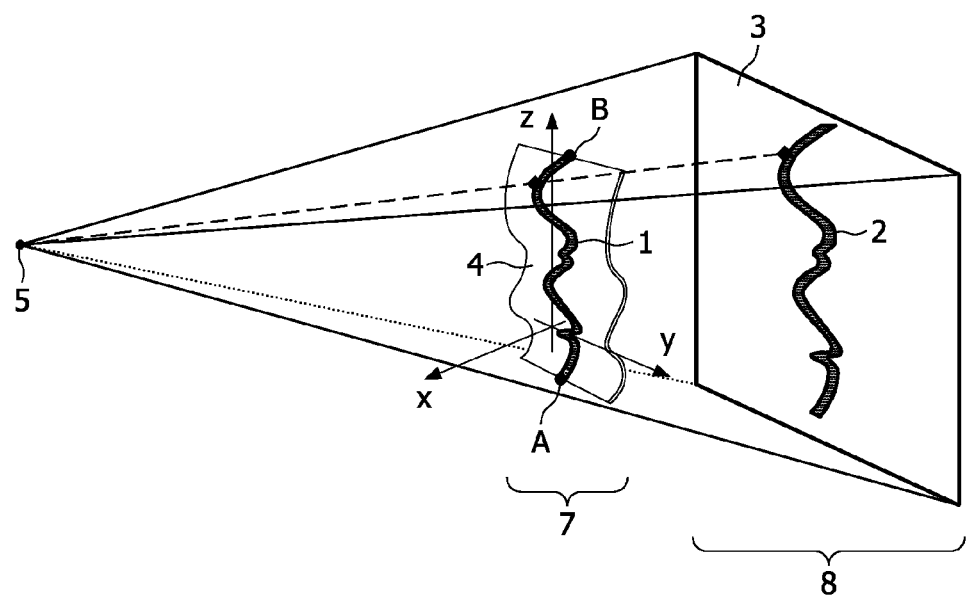
FIG. 4 shows the correspondence between the projected image of the blood vessel's 3D tubular structure in the 2D projection plane and a curved reformat image of said blood vessel in a curved visualization plane oriented essentially parallel to the 2D projection plane, said curved visualization plane following the spatial course of the blood vessel's 3D tubular structure in its longitudinal direction.

Now let viewing vector $\vec{v}$ of the curved reformat correspond to the vector perpendicular to the projection image 2 which goes through a given focal spot 5 as shown in FIG. 3. Any point of the 3D tubular structure's voxel volume in 3D vector space V can then be mapped on the 2D projection image 8 by using mapping rule $\vec{l}(t) \mapsto P(\vec{l}(t))$, which also means that also any point on curved visualization plane 4 can be mapped on the projection image 2. This relation can be exploited when the fused image of the curved reformat and the X-ray image are depicted together: For a given point on the curved reformat image, the corresponding 3D position can be obtained by using the inverse of mapping $C_R$. The position on the X-ray image can then be obtained by using mapping P (see FIG. 6).

Up to now, it has been described how both images are mapped on the curved reformat image space by employing a fusing procedure. The final compositing of the two images can be done in any fashion that is desired. For instance, a color can be assigned to each image, and then an alpha blending algorithm—a process of combining an image with a background to create the appearance of partial transparency—can be performed. Thereby, output color vector $\vec{C}_{out}$ for a particular fused pixel is determined by calculating a convex combination of color vectors $\vec{C}_1$ and $\vec{C}_2$ of the two images:

$$\vec{C}_{out} = \vec{C}_1 \cdot i_1 \cdot (1-\alpha) + \vec{C}_2 \cdot i_2 \cdot \alpha \text{ (with } 0 \leq \alpha \leq 1\text{)}. \quad (14)$$

Thereby, each color vector can e.g. be expressed as an RGB triplet with components representing the three primary colors of the additive color system. In this equation, $i_1$ and $i_2$ are the intensities for that particular pixel of the input images, and $\alpha$ denotes a blending factor (also referred to as "compositing factor") which describes the transparency of an image to be overlaid and can be chosen to be a real-valued constant or a function of intensities $i_1$ and $i_2$.

Optionally, the visualization of the projection image 2 may be restricted to a region of interest around the 3D tubular structure 1 to be visualized. Only within this region of interest the 3D correspondence can be assumed to be accurate. Further, optionally, the region of interest can be restricted to an area around a sub-object within the 3D tubular object, such as e.g. a tracked catheter tip.

Figure 6:
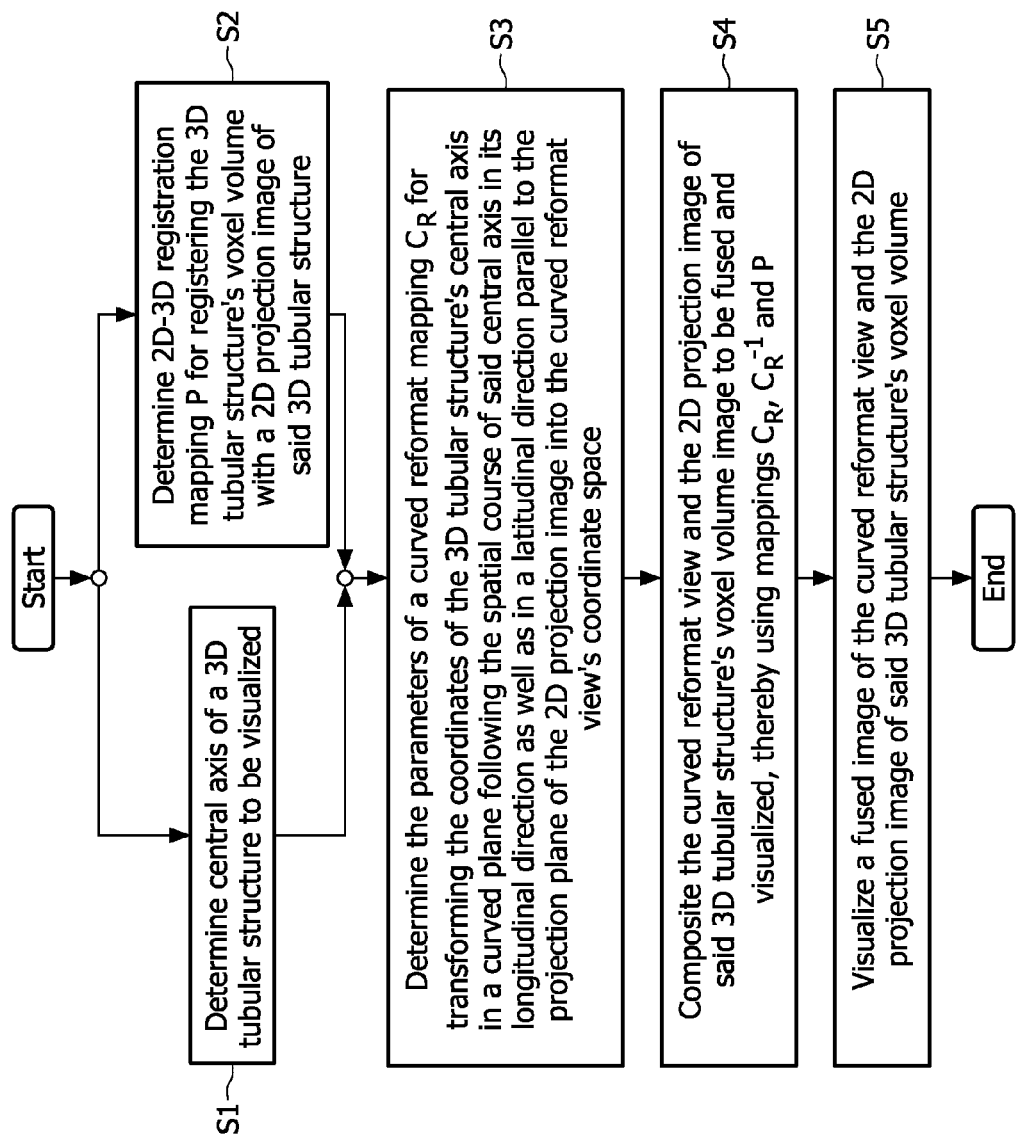
FIG. 6 shows a flowchart illustrating the process of the proposed method according to an exemplary embodiment of the present invention.

A flowchart illustrating the proposed method according to an exemplary embodiment of the present invention is depicted in FIG. 6. After having determined (S1) the central axis of the 3D tubular structure 1 to be visualized as well as having determined (S2) the parameters of a 2D-3D registration mapping (P) for registering the 3D tubular structure's voxel volume with the 2D projection image 8, the method is continued with the step of determining (S3) the parameters of a curved reformat mapping (C) for transforming the coordinates of the 3D tubular structure's central axis in a curved visualization plane 4 following the spatial course of said central axis in its longitudinal direction as well as in a latitudinal direction parallel to the projection plane 3 of the 2D projection image 8 into the curved planar reformat view's coordinate space. After that, a combining step for compositing (S4) the curved planar reformat view 7' and the 2D projection image 8 of said 3D tubular structure's voxel volume by performing said 2D-3D registration mapping P, curved reformat mapping $C_R$ and/or a mapping rule ($C_R^{-1}$) inverse to said curved reformat mapping $C_R$ is performed before finally a fused image of the curved planar reformat view 7' and the 2D projection image 8 of said 3D tubular structure's voxel volume after being submitted to the 2D-3D registration mapping P, the curved reformat mapping $C_R$ and/or the inverse curved reformat mapping $C_R^{-1}$ can be visualized (S5).

Figure 7:
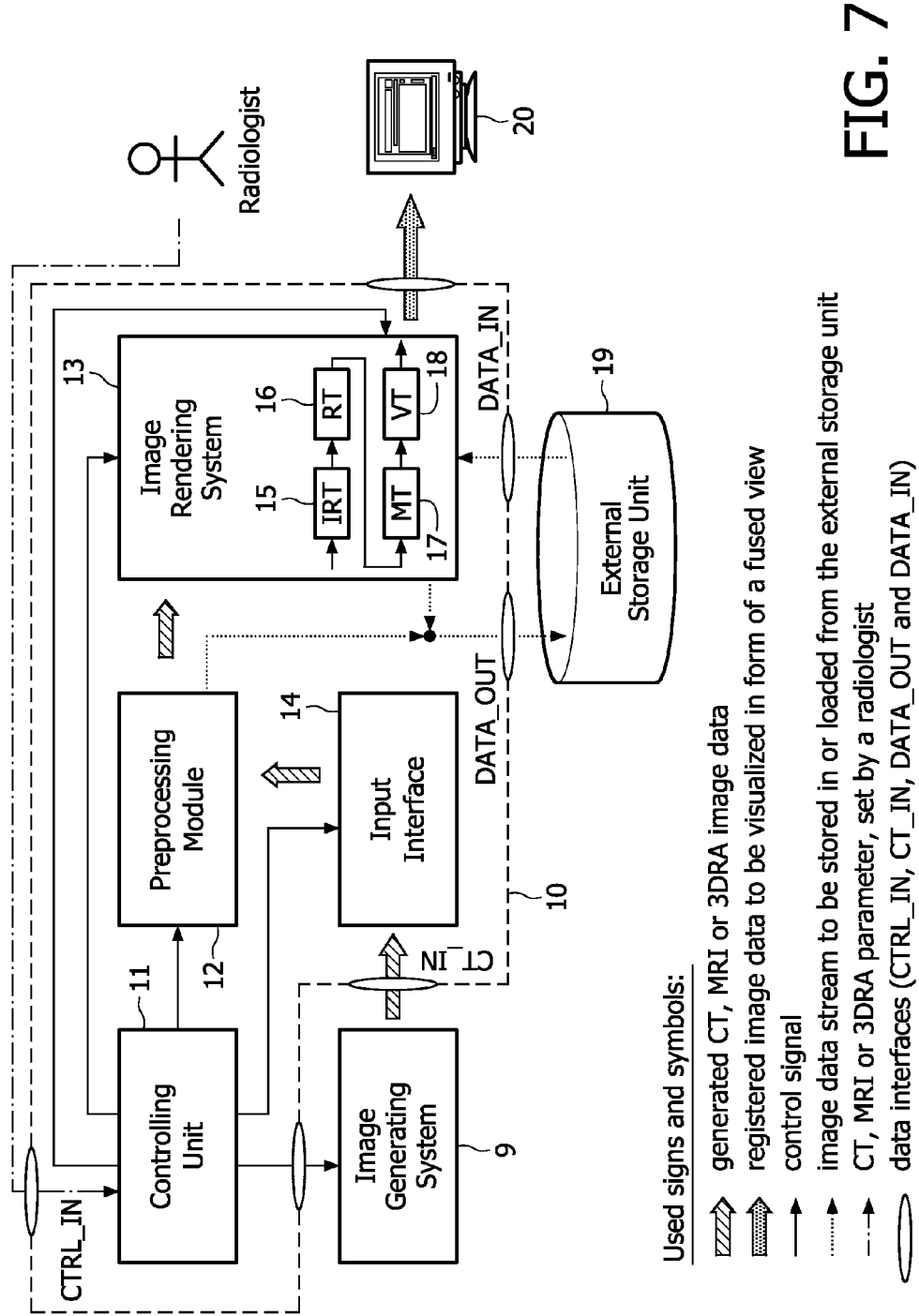
FIG. 7 shows a schematic block diagram of an image processing, visualization and archiving system according to a further exemplary embodiment of the invention.

FIG. 7 depicts a schematic block diagram of an image processing, visualization and archiving system according to an exemplary embodiment of the present invention which makes it possible to store and visualize rendered image data showing anatomical objects, pathological structures and interventional devices, etc. in the interior of a patient's body on the monitor 20 of an angiography workstation connected to said image processing, visualization and archiving system. These image data are generated and provided by an image generating system 9, such as e.g. a computed tomography, magnet resonance tomography or 3D rotational angiography device. As shown in FIG. 7, the image data generated by said image generating system 9 is fed to an image processing system 10 via an input interface 14. Aside from a controlling unit 11 that controls data exchange with the image generating system 9, said image processing system 10 may comprise a preprocessing module 12 which may particularly be equipped with a digital filter for noise reduction and contrast enhancement. An integrated image rendering application 13 is applied for rendering 3D views, curved planar reformat views and 2D projection images that are rendered based on the generated image data of a given 3D tubular structure's voxel volume to be visualized.

According to the embodiment as depicted in the block diagram shown in FIG. 7, said image rendering system 13 comprises an image recognition tool 15 for determining the central axis of the 3D tubular structure 1 to be visualized as well as a registration tool 16 for determining the parameters of a 2D-3D registration mapping P used for registering the 3D tubular structure's voxel volume with the 2D projection image 8. Thereby, said registration tool 16 may also be used for determining the parameters of a curved reformat mapping $C_R$ for transforming the coordinates of the 3D tubular structure's central axis in a curved plane 4 following the spatial course of said central axis in its longitudinal direction as well as in a latitudinal direction parallel to the projection plane 3 of the 2D projection image 8 into the curved planar reformat view's coordinate space. The image rendering system 13 is further equipped with a mapping tool 17 for compositing the curved planar reformat view 7' and the 2D projection image 8 of said 3D tubular structure's voxel volume by performing said 2D-3D registration mapping P, the curved reformat mapping $C_R$ and/or a mapping rule ($C_R^{-1}$) which is inverse to this curved reformat mapping $C_R$. A visualization tool 18, integrated in said image rendering system 13, serves for visualizing a fused image of the curved planar reformat view 7' and the 2D projection image 8 of said 3D tubular structure's voxel volume after being submitted to said 2D-3D registration mapping P, curved reformat mapping $C_R$ and/or inverse curved reformat mapping $C_R^{-1}$.

As shown in FIG. 7, image data which have been generated by the image generating system 9 and supplied to the image processing system 10 via said input interface 14 can temporarily or persistently be stored in an image data archive of an external storage unit 19. For being visualized, stored image data can be loaded via a data input interface DATA_IN into a local temporary storage of the image processing system 10 (not shown), thereby using a standardized data format such as e.g. the DICOM format.

APPLICATIONS OF THE PRESENT INVENTION

The present invention and the above exemplary embodiments, which can either be realized individually or in arbitrary combinations thereof, could be used in any situation where it is beneficial to display a projective image of a blood vessel's 3D tubular structure to be visualized without spatial foreshortening and to be able to perform measurements without further calibration. In particular, this would be the case in the minimal-interventional treatment of vascular stenosis by means of stenting. The lengths and diameters of the stenosis and healthy parts of the blood vessel could then be measured without performing a calibration procedure.

An implementation of the proposed method is foreseen in the near future for interventional cardiology where diagnosis is increasingly performed on the basis of computed tomography. Integration of CT images in a cardiovascular X-ray cathlab as described by the present invention will help to reduce contrast and radiation during the cardiac interventional procedure and may help diagnosis by allowing better comparison between CT images and cardiovascular X-ray images by ensuring coupled views. Diagnostic CT and MR data are also frequently available for other areas of vascular intervention and could be used to optimize the process of vascular intervention.

More generic, the present invention can be applied to all areas where 3D imaging can be used to guide view selection in an interventional X-ray system. The inventive principle can also be expanded to other X-ray systems such as mobile C-arc systems which are used to guide treatment procedures. 3D imaging can come from a different imaging modality (e.g. a computed tomography device or magnet resonance tomography scanner, etc.) either pre-procedural or from 3D reconstruction on the (cardiovascular) X-ray system itself.

Finally, it should be noted that instead of a CT data set any set of 3D voxel data (e.g. MR image data, 3D ultrasound data or 3D reconstruction data) can be used and that the idea of the present invention can be applied to any 3D structure where curved reformatted viewing provides a benefit in terms of visualization.

While the present invention has been illustrated and described in detail in the drawings and in the foregoing description, such illustration and description are to be considered illustrative or exemplary and not restrictive, which means that the invention is not limited to the disclosed embodiments. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage. A computer program may be stored/distributed on a suitable medium, such as e.g. an optical storage medium or a solid-state medium supplied together with or as part of other hardware, but may also be distributed in other forms, such as e.g. via the Internet or other wired or wireless telecommunication systems. Any reference signs in the claims should not be construed as limiting the scope of the invention.

The invention claimed is:

1. A method for planning or guiding an intervention procedure in a 3D tubular structure comprising rendering and displaying the 3D tubular structure's pre-procedural curved planar reformat view, wherein the rendering of the curved planar reformat view comprises smoothing a center axis of the 3D tubular structure by removing those parts of the center axis that protrude in a direction of a latitudinal vector that is orthogonal to the center axis, and following or steering the viewing direction of the curved planar reformat view by the viewing angle on a segmented or raw representation of the 3D tubular structure's rendered voxel volume to be visualized or to the C-arm geometry of a 3D rotational angiography device's C-arm system, wherein the viewing angle on the 3D tubular structure's rendered voxel volume is manipulated in such a way that the corresponding curved planar reformat view does not change, by rotating the viewing angle about a latitudinal direction so that the 3D view allows the selection of a view in which no overlap between different vessel segments occurs, wherein the viewing angle rotation is a unique rotation by making an up-vector of the curved planar reformat view on the 3D tubular structure's voxel data set correspond to the up-vector of the 3D rotational angiography device's C-arm system for a given yaw position, wherein the up-vector is given by the y-axis of the reformatted 2D view port.

2. The method according to claim 1, further comprising re projecting a 2D projection image showing a two-dimensional projection of said 3D tubular structure into the coordinate space of the curved planar reformat view by being submitted to a spatial deformation algorithm yielding transformed image data matching with the spatial course of the 3D tubular structure in the curved planar reformat view's coordinate space, and displaying a fused image representation of the 3D tubular structures curved planar reformat view and the 2D projection image that is essentially free of spatial foreshortening and enables direct measurements which do not need to be calibrated.

3. The method according to claim 2, further comprising the steps of
determining the central axis of the 3D tubular structure to be visualized,
determining the parameters of a 2D-3D registration mapping (P) for registering the 3D tubular structure's rendered voxel volume with a 2D projection image,
determining the parameters of a curved reformat mapping (C) for transforming the coordinates of the 3D tubular structure's central axis in a curved plane following the spatial course of said central axis in its longitudinal direction as well as in a latitudinal direction parallel to the projection plane of the 2D projection image into the curved planar reformat view's coordinate space,
compositing the curved planar reformat view and the 2D projection image of said 3D tubular structure's rendered voxel volume by performing said 2D-3D registration mapping (P), curved reformat mapping (C) and/or a mapping rule ($C^{-1}$) inverse to said curved reformat mapping (C), and
visualizing a fused image of the curved planar reformat view and the 2D projection image of said 3D tubular structure's rendered voxel volume after being submitted to said 2D-3D registration mapping (P), curved reformat mapping (C) and/or inverse curved reformat mapping ($C^{-1}$).

4. The method according to claim 2, further comprising generating a fused visualization of the curved planar reformat view and the 2D projection image of said 3D tubular structure's rendered voxel volume by an alpha blending technique.

5. An image rendering system-for planning or guiding an intervention procedure in a 3D tubular structure, the system comprising
a preprocessor comprising a digital filter; and
an integrated image processor comprising:
an image recognition processor for determining the central axis of the 3D tubular structure to be visualized,
a registration processor for determining the parameters of a 2D-3D registration mapping (P) used for registering the 3D tubular structure's rendered voxel volume with the 2D projection image and determining the parameters of a curved reformat mapping (C) for transforming the coordinates of the 3D tubular structure's central axis in a curved plane following the spatial course of said central axis in its longitudinal direction as well as in a latitudinal direction parallel to the projection plane of the 2D projection image into the curved planar reformat view's coordinate space, wherein the transforming of the 3D tubular structure's central axis comprises smoothing the 3D tubular structure's central axis by removing those parts of the central axis that protrude in a direction of a latitudinal vector that is orthogonal to the central axis,
a mapping processor for compositing the curved planar reformat view and the 2D projection image of said 3D tubular structure's rendered voxel volume by performing said 2D-3D registration mapping (P), curved reformat mapping (C) and/or a mapping rule ($C^{-1}$) inverse to said curved reformat mapping (C), and
a visualization processor for creating a fused image of the curved planar reformat view and the 2D projection image of said 3D tubular structure's rendered voxel volume after being submitted to said 2D-3D registration mapping (P), curved reformat mapping (C) and/or inverse curved reformat mapping ($C^{-1}$); and
a display for visualizing the fused image;
wherein the system is configured so that the viewing direction of the curved planar reformat view follows or is steered by the viewing angle on a segmented or raw representation of the 3D tubular structure's rendered voxel volume to be visualized or to the C-arm geometry of a 3D rotational angiography device's C-arm system, wherein the viewing angle on the 3D tubular structure's rendered voxel volume is manipulated in such a way that the corresponding curved planar reformat view does not change, by rotating the viewing angle about a latitudinal direction so that the 3D view allows the selection of a view in which no overlap between different vessel segments occurs, wherein the viewing angle rotation is a unique rotation by making an up-vector of the curved planar reformat view on the 3D tubular structure's voxel data set correspond to the up-vector of the 3D rotational angiography device's C-arm system for a given yaw position, wherein the up-vector is given by the y-axis of the reformatted 2D view port.

6. The image rendering system according to claim 5, wherein the system is configured so that the viewing angle on a segmented or raw representation of the 3D tubular structure's rendered voxel volume follows the viewing direction of the curved planar reformat view.

7. The image rendering system according to claim 5, wherein the system is configured so that the C-arm geometry of a 3D rotational angiography device's C-arm system given by the roll ($\theta_x$), pitch ($\theta_y$) and yaw angle ($\theta_z$) of the C-arm is steered by the viewing direction of the curved planar reformat view.

8. The image rendering system according to claim 5, wherein said image rendering system is configured for re-projecting a 2D projection image showing a two-dimensional projection of said 3D tubular structure into the coordinate space of the curved planar reformat view by submitting said 2D projection image to a spatial deformation algorithm yielding transformed image data matching with the spatial course of the 3D tubular structure in the curved planar reformat view's coordinate space, and displaying a fused image representation of the 3D tubular structure's curved planar reformat view and the 2D projection image that is essentially free of spatial foreshortening and enables direct measurements which do not need to be calibrated.

9. The image rendering system according to claim 5, said image rendering system being configured for performing an alpha blending technique when generating a fused visualization of the curved planar reformat view and the 2D projection image of said 3D tubular structure's rendered voxel volume.

10. A non-transitory computer-readable medium having stored thereon instructions for performing a method for planning or guiding an intervention procedure in a 3D tubular structure, the method comprising rendering and displaying a 3D tubular structure's pre-procedural curved planar reformat view, wherein the rendering of the curved planar reformat view comprises smoothing a center axis of the 3D tubular structure by removing those parts of the center axis that protrude in a direction of a latitudinal vector that is orthogonal to the center axis, and following or steering the viewing direction of the curved planar reformat view by the viewing angle on a segmented or raw representation of the 3D tubular structure's rendered voxel volume to be visualized or the C-arm geometry of a 3D rotational angiography device's C-arm system, wherein the viewing angle on the 3D tubular structure's rendered voxel volume is manipulated in such a way that the corresponding curved planar reformat view does not change, by rotating the viewing angle about a latitudinal direction so that the 3D view allows the selection of a view in which no overlap between different vessel segments occurs, wherein the viewing angle rotation is a unique rotation by making an up-vector of the curved planar reformat view on the 3D tubular structure's voxel data set correspond to the up-vector of the 3D rotational angiography device's C-arm system for a given yaw position, wherein the up-vector is given by the y-axis of the reformatted 2D view port.

11. The non-transitory computer-readable medium according to claim 10, wherein the viewing direction of the curved planar reformat view (7') follows the viewing angle on a segmented or raw representation of the 3D tubular structure's rendered voxel volume to be visualized.

12. The non-transitory computer-readable medium according to claim 10, wherein the viewing direction of the curved planar reformat view (7') is steered by the C-arm geometry of a 3D rotational angiography device's C-arm system (6) given by the roll ($\theta_x$), pitch ($\theta_y$) and yaw angle ($\theta_z$) of the C-arm.

13. The non-transitory computer-readable medium according to claim 10, wherein the C-arm geometry of a 3D rotational angiography device's C-arm system. (6) given by the roll ($\theta_x$), pitch ($\theta_y$) and yaw angle ($\theta_z$) of the C-arm is steered by the viewing direction of the curved planar reformat view (7').

14. The non-transitory computer-readable medium according to claim 10, the method further comprising re-projecting a 2D projection image showing a two-dimensional projection of said 3D tubular structure into the coordinate space of the curved planar reformat view by being submitted to a spatial deformation algorithm yielding transformed image data matching with the spatial course of the 3D tubular structure in the curved planar reformat view's coordinate space, and displaying a fused image representation of the 3D tabular structure's curved planar reformat view and the 2D projection image that is essentially free of spatial foreshortening and enables direct measurements which do not need to be calibrated.

15. The non-transitory computer-readable medium according to claim 10, the method further comprising the steps of
determining the central axis of the 3D tubular structure to be visualized,
determining the parameters of a 2D-3D registration mapping (P) for registering the 3D tubular structure's rendered voxel volume with the 2D projection image,
determining the parameters of a curved reformat mapping (C) for transforming the coordinates of the 3D tubular structure's central axis in a curved plane following the spatial course of said central axis in its longitudinal direction as well as in a latitudinal direction parallel to the projection plane of the 2D projection image into the curved planar reformat view's coordinate space,
compositing the curved planar reformat view and the 2D projection image of said 3D tubular structure's rendered voxel volume by performing said 2D-3D registration mapping (P), curved reformat mapping (C) and/or a mapping rule ($C^{-1}$) inverse to said curved reformat mapping (C1, and
visualizing a fused image of the curved planar reformat view and the 2D projection image of said 3D tubular structure's rendered voxel volume after being submitted to said 2D-3D registration mapping (P), curved reformat mapping (C) and/or inverse curved reformat mapping ($C^{-1}$).

16. The non-transitory computer-readable medium according to claim 14, the method further comprising the step of performing an alpha blending technique for generating a fused visualization of the curved planar reformat view and the 2D projection image of said 3D tubular structure's rendered voxel volume.

* * * * *